United States Patent [19]

Fereshetian

[11] Patent Number: 4,748,903
[45] Date of Patent: Jun. 7, 1988

[54] COMBINATION OVEN AND POPCORN POPPER UNIT

[76] Inventor: Seran Fereshetian, 1984 Audubon Dr., Dresher, Pa. 19025

[21] Appl. No.: 69,347

[22] Filed: Jul. 2, 1987

[51] Int. Cl.$^4$ .............................................. A47J 37/01
[52] U.S. Cl. ......................................... 99/340; 99/339; 99/323.5; 99/323.9; 99/385; 99/400; 99/401
[58] Field of Search ... 99/339, 340, 357, 323.4-323.11, 99/385, 389, 392, 400, 401, 402; 126/41 R, 15 A, 21 A; 219/400, 405, 411, 413, 385, 386, 506

[56] References Cited

U.S. PATENT DOCUMENTS

| | | | |
|---|---|---|---|
| 1,568,767 | 1/1926 | Proulx | 99/323.5 |
| 3,083,450 | 4/1963 | Harvey | 99/401 |
| 4,072,091 | 2/1978 | Richardson | 99/323.5 |
| 4,152,974 | 5/1979 | Tienor | 99/323.8 |
| 4,512,247 | 4/1985 | Friedman | 99/323.9 |

Primary Examiner—Henry J. Recla
Assistant Examiner—Linda J. Sholl
Attorney, Agent, or Firm—Caesar, Rivise, Bernstein, Cohen & Pokotilow, Ltd.

[57] ABSTRACT

A combination oven and popcorn popper unit usable to cook or heat food items and to pop popcorn kernels. A lower oven section has internal walls defining a food-receiving compartment, and a food supporting member is located in the compartment for supporting food items to be cooked or heated. A container above the oven section is provided for receiving kernels of corn to be popped, and heating means is provided below the food supporting means for providing heat for the oven section and also for heating the kernels of corn in the container, during use of the device as a popcorn popper. Deflector means communicates with the container for deflecting popped kernels of corn along a predetermined path of travel out of the unit.

11 Claims, 5 Drawing Sheets

COMBINATION OVEN AND POPCORN POPPER UNIT

FIELD OF THE INVENTION

This invention relates generally to a multi-purpose heating device, and more specifically to a combination oven and popcorn popper unit.

BACKGROUND ART

A variety of popcorn poppers are known in the prior art, as is exemplified by the following U.S. Pat. Nos.:
Des. 273,358; Johnson, et al.
Des. 279,070; Morrison, et al.
1,568,767; Proulx
2,241,754; Wilsey
3,666,499; Isnor
3,722,399; Cole
3,847,067; Munsey
4,072,091; Richardson
4,166,208; Martel, et al.
4,445,427; Kiczek
4,512,247; Friedman U.S. Pat. No. 4,072,091, issued to Richardson, discloses a popcorn popper having a container in which the kernels to be popped are initially retained, a receiver for the corn after it has been popped and a hollow deflector chute for directing the popped kernels from the container to the receiver. Richardson also discloses the use of a hollow sleeve 28, in combination with a sleeve 16, to heat a baby bottle.

U.S. Pat. No. 1,568,767, issued to Proulx, discloses a combination electrical appliance having an enclosed compartment provided by screen panels 10 and a movable door frame 5' permitting access to the compartment. An electric heating unit 11 is provided adjacent one end of the compartment, and below a frame structure which is adapted to receive a removable pan 9. When the pan 9 is intended to be used to either cook or heat a food item it is supported on the upper surface of the enclosed compartment, above the heating unit 11. To use the unit as a popcorn popper the appliance is inverted, to thereby position the heating coils below the enclosed compartment in which the kernels of popcorn can be popped.

U.S. Pat. No. 3,666,499, issued to Isnor, discloses a popcorn popper in which a cover functions as an enclosure in which the corn is popped, and also as a serving dish for the popped corn.

U.S. Pat. Nos. 3,722,399 (Cole); 4,166,208 (Martel, et al.); 3,847,067 (Munsey) and 4,512,247 (Friedman) disclose different arrangements for melting butter as the popcorn is being popped, and directing the melted butter onto the popped kernels of corn.

U.S. Pat. No. 4,445,427, issued to Kiczek, discloses a popcorn popper in which the kernels to be popped are contained in a first vessel, and are directed by a deflector system into a second vessel after they have been popped.

U.S. Pat. No. 2,241,754, issued to Wilsey, employs a blower arrangement for circulating heated air into the popping chamber of a popcorn popper.

Design U.S. Pat. Nos. 273,358 (Johnson, et al.) and 279,070 (Morrison, et al.) disclose popcorn poppers in which a deflecting hood is attached to a container in which the kernels of popcorn are retained for popping.

Although multi-purpose electrical appliances for popping popcorn are known, Applicant believes that need exists for an improved multi-purpose appliance combining an oven for heating or cooking food items with a popcorn popper.

DISCLOSURE OF THE INVENTION

The objects of this invention are achieved by a combination oven and popcorn popper unit usable to cook or heat food items, an also to pop popcorn kernels, said oven and popcorn popper including a lower over section having internal walls defining a food-receiving compartment and a support means in the compartment for supporting food items to be cooked or heated; a container above said over section for receiving kernels of corn to be popped; heating means below the food support means for providing heat for cooking or heating food in the lower oven section and for popping kernels of corn in the container, and deflector means communicating with the container for deflecting popped kernels of corn along a predetermined path of travel.

In a preferred form of this invention the deflector means has an opening at an end remote from the container, and a receiver for popped kernels of corn is removably retained over the opening when the receiver is not in use, and has a retaining member cooperable with the deflector means for supporting the retainer adjacent the opening for receiving popped kernels of corn when the unit is being used as a popcorn popper.

In the preferred embodiment of this invention the distal end of the deflector means includes a removable panel which, when removed, provides easy access to the container for facilitating the addition of kernals of corn to be popped into the container. Most preferably the removable panel includes a recess for receiving butter to be melted by the heat generated by utilizing the popper.

In the preferred embodiment of this invention the upper wall of the oven section is a removable heat reflector for reflecting heat into the food-receiving compartment when the lower over section is being used to either cook or heat food therein, and is removable to permit heat to be directed to the container in which kernels of popcorn are retained when the unit is being used as a popcorn popper.

In the most preferred form of this invention a timer is employed during the corn popping mode of operation to turn on a fan which directs heat to the container in which the kernels of popcorn are retained, and for actuating a music box at the end of a predetermined period of time set on the timer for providing an audible signal that the popping cycle has been completed.

BRIEF DESCRIPTION OF THE DRAWINGS

Other objects and many of the attendant advantages of this invention will be readily appreciated as the same becomes better understood by reference to the following detailed description when considered in connection with the accompanying drawings wherein.

DESCRIPTION OF THE BEST MODE OF THE INVENTION

Figure 1:
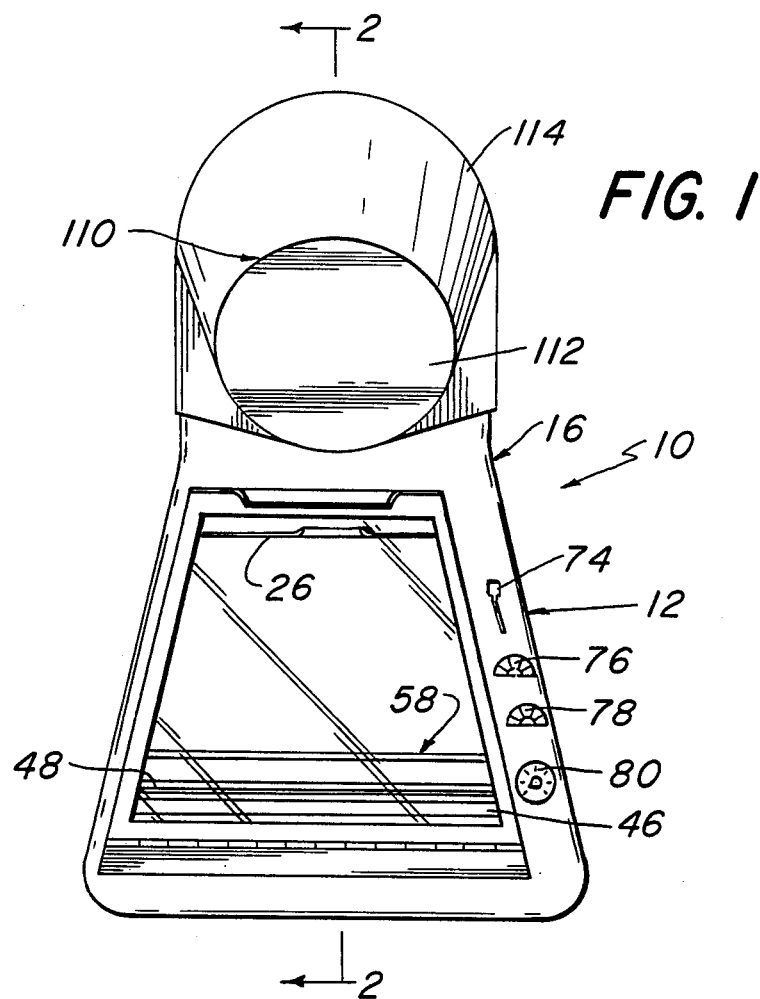
FIG. 1 is a front elevational view of the combination oven and popcorn popper of this invention.
Figure 2:
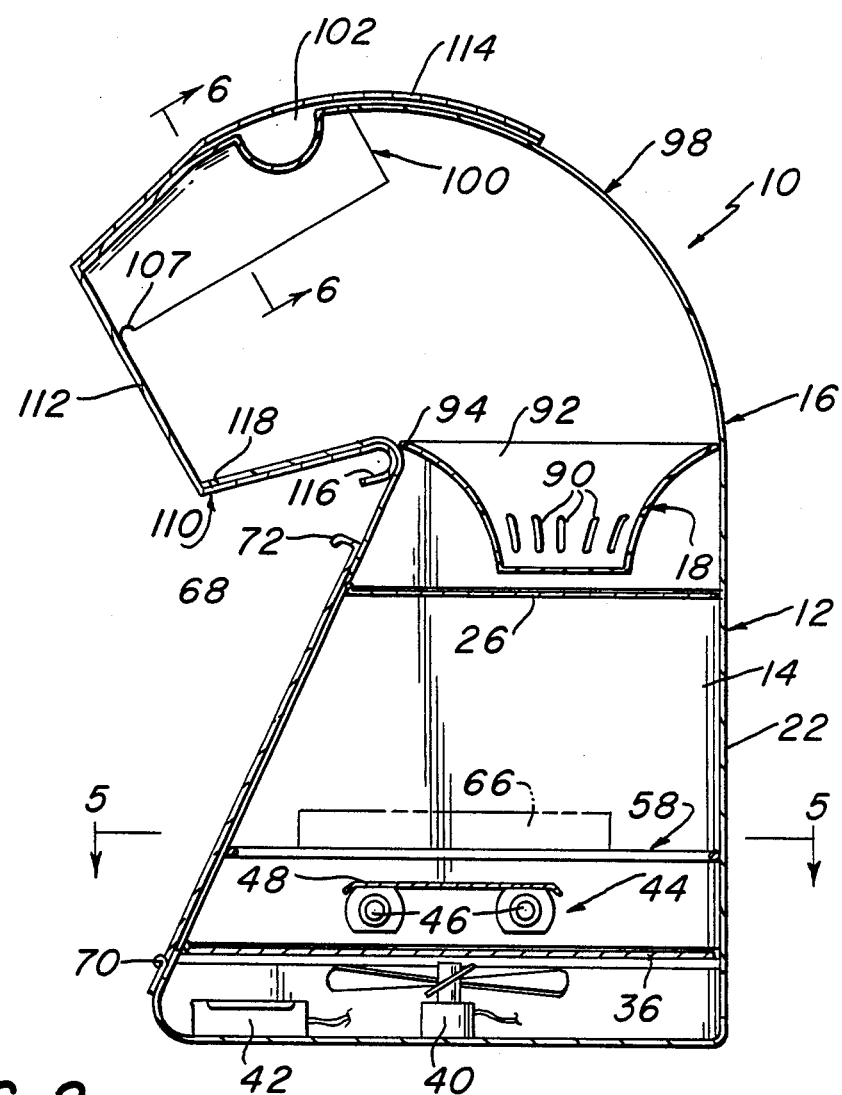
FIG. 2 is a sectional view along line 2—2 of FIG. 1.
Figure 3:
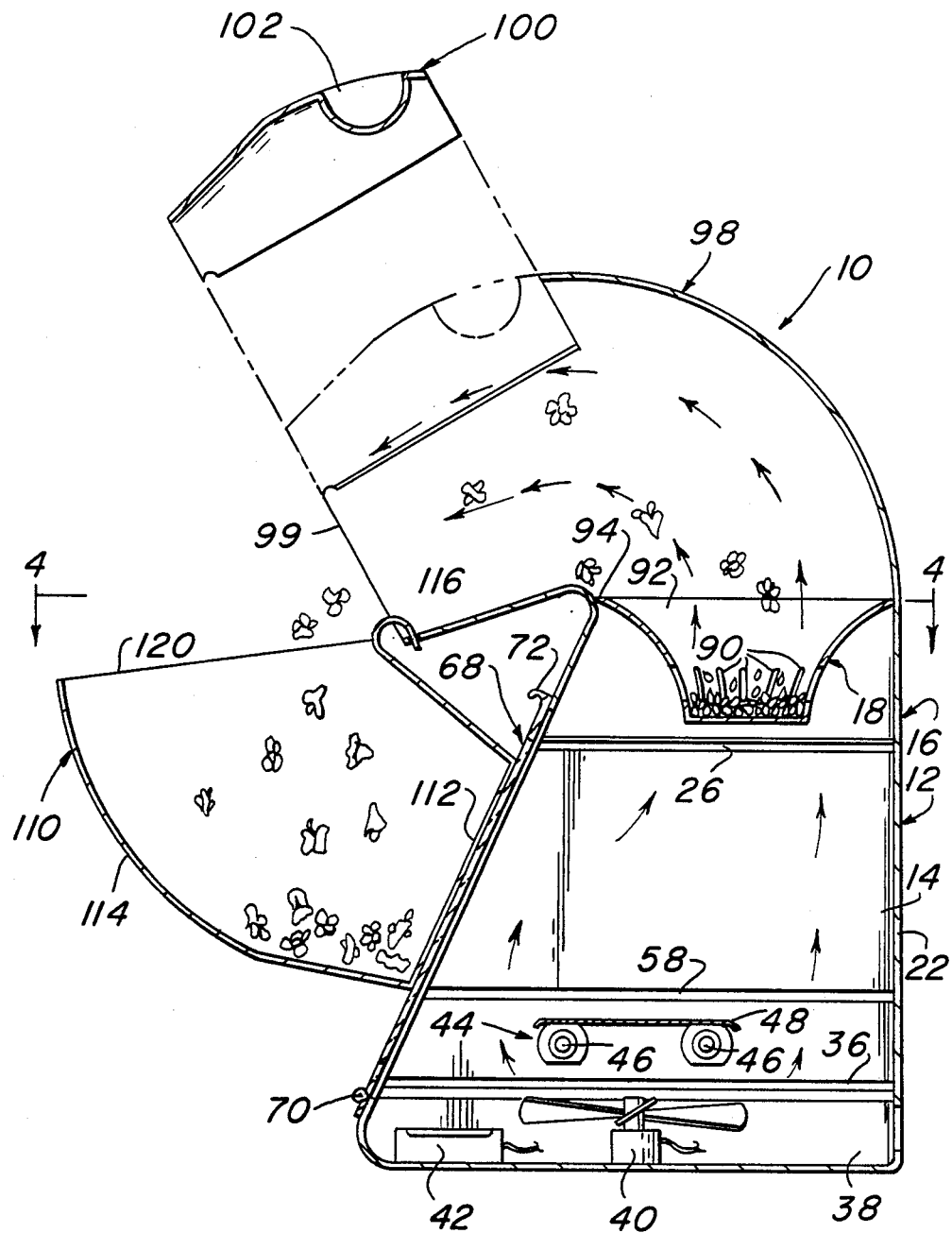
FIG. 3 is a sectional view similar to FIG. 2, but showing the unit assembled for use in the popping of popcorn.

Referring now in greater detail to the various figures of the drawings wherein like reference characters refer to like parts a combination oven and popcorn popper unit embodying the present invention is generally shown at 10 in FIGS. 1-3. The device 10 basically comprises a lower oven section 12 having a food-receiving compartment 14 (FIG. 8) for receiving food items to be heated or cooked, and an upper popcorn popping section 16 above the food-receiving compartment 14, and including a container 18 for receiving kernels of popcorn to be popped.

Referring to FIGS. 1, 2, 4, 5 and 8, the lower oven section 12 preferably is in the form of a toaster oven having an outer casing provided by a front wall 20, a rear wall 22 and a pair of outer sidewalls 24. A removable heat reflector tray 26 separates the oven section 12 from the popcorn popping section 16, and is supported in laterally spaced-apart, elongate grooves 28 formed in laterally spaced-apart sidewall members 29 adjacent the upper end thereof. The heat reflector tray 26 includes a handle or gripping section 30, and the body of the tray rests on the lower surface region of the grooves 28.

Figure 5:
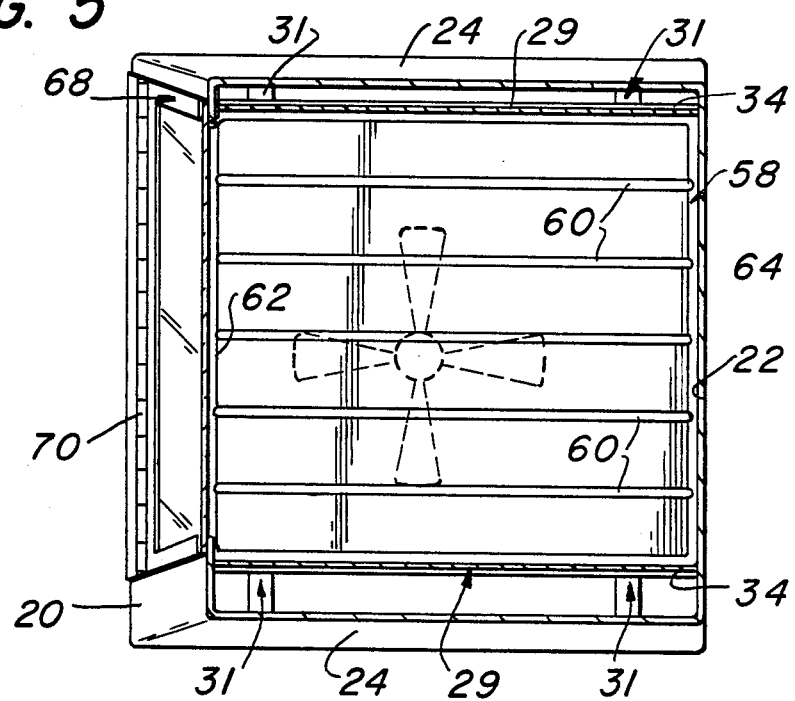
FIG. 5 is a sectional view along line 5—5 of FIG. 2.
Figure 8:
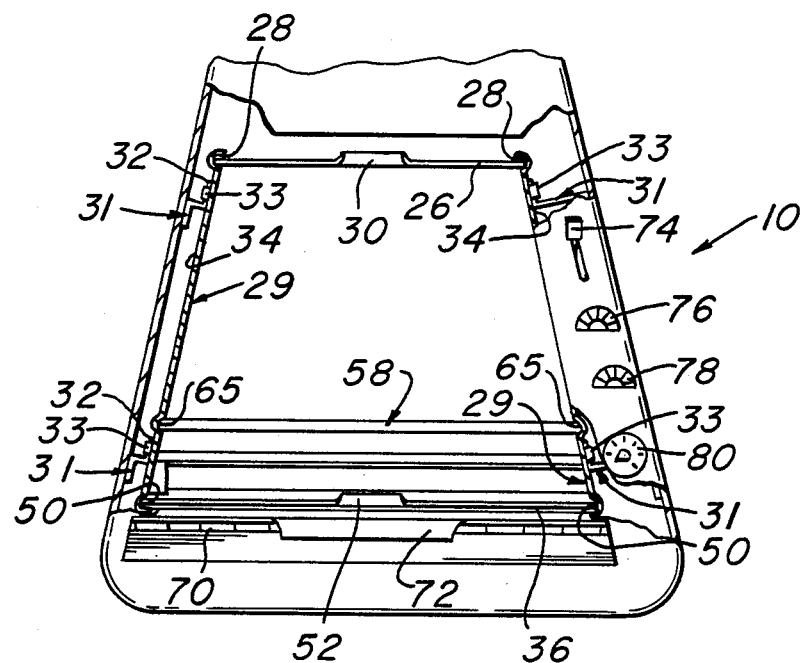
FIG. 8 is a fragmentary front elevational view of the lower oven section with the oven door open to show details of construction.

As can be seen best in FIGS. 5 and 8, each of the inner sidewall members 29 is spaced-apart from its adjacent outer sidewall 24, and is attached to said sidewall by four generally Z-shaped brackets 31; two of said brackets being adjacent the lower surface of each of said inner sidewall members 29 and two of said brackets being adjacent the upper surface of each of said inner sidewall members.

Each of the generally Z-shaped brackets 31 is welded to an inner surface of an outer sidewall 24, and includes an upper section 32 having a generally U-shaped opening in it (not shown) for receiving an annular projection 32 secured to an outer surface 34 of an adjacent inner sidewall member 29, to thereby support the sidewall members 29 in positions spaced inwardly from the outer sidewalls 24. These inner sidewall members 29 cooperate with the outer sidewalls 24 to provide a boxed-in region in which the appropriate electrical circuitry (not shown) for operating the device 10 is located.

As can be seen best in FIGS. 2 and 8, a removable crumb-receiving tray 36 separates a lower compartment 38 housing a fan assembly 40 and a music box 42 from an electrical heating assembly 44. The heating assembly 44 is of a conventional construction; provided by resistance heating rods 46 covered by a vented shield 48 to uniformly distribute the heat from the heating rods 46. The removable crumb-receiving tray 36, like the heat reflector tray 26, extends through laterally spaced-apart, elongate grooves 50 formed in the laterally spaced-apart inner sidewall members 29. The crumb-receiving tray 36, like the heat reflecter tray 26, includes a handle or gripping section 52 forming a part of the outer edge thereof.

As can be seen best in FIGS. 2, 5 and 8, a tray 58, which is formed of elongate rods 60 welded to spaced-apart front and rear peripheral support members 62 and 64, is supported within laterally spaced-apart grooves 65 which are formed into the inner sidewall members 29 in a location above the crumb-receiving tray 36. This tray 58 is adapted to support items of food to be cooked or heated thereon, and in the illustrated embodiment is shown supporting a slice of bread (illustrated in phantom at 66 in FIG. 2) for toasting.

Referring to FIGS. 1, 2 and 8, access to the food-receiving compartment 14 of the lower oven section 12 is provided through a front door 68 that is movable between opened and closed positions about a horizontal hinge 70. The front door 68 includes a handle 72 adjacent its upper end to permit the door to be easily gripped by a user of the device 10.

As is seen best in FIG. 1, the preferred oven section 12 is in the form of a conventional toaster oven, having the normal controls associated therewith. In particular, the lower oven section 12 includes a toaster on-off slide switch 74 for completing the circuit to the resistance heating rods 46 during the toasting mode of operation. The degree of heating, to control the degree of toasting, is determined by a thermal control member 76, which sets the temperature at which the on-off slide switch 74 automatically turns off.

The lower oven section 12 further includes a conventional rotary switch 78 for both turning on the oven and setting the desired oven temperature. The above-described switches and controls 74, 76 and 78 are conventionally employed in toaster-ovens, and are well-known to those skilled in the art. However, in addition to the above-described switches and controls, the device 10 of this invention includes a timer switch 80 for controlling the operation of the device 10 when it is employed to pop popcorn, as will be described in greater detail hereinafter.

The manner in which the lower oven section 12 is utilized to either cook or heat items of food can be best understood by referring to FIG. 2. In particular, when the oven section 12 is being utilized to heat or cook food within the food-receiving compartment 14, both the heat reflector tray 26 and the crumb-receiving tray 36 are retained in the device, as is shown in FIG. 2. These two trays basically define the upper and lower walls of the oven, with the peripheral walls of the oven being provided by front wall 20, rear wall 22 and the pair of inner sidewall members 29. The removable heat reflector tray 26 is important to this invention, since it is relied upon to reflect heat generated by the resistance heating rods 46 downwardly into the food-receiving compartment 14, to assist in maintaining a uniform temperature within said oven. Moreover, when the lower oven section 12 is being employed as a toaster, the heat reflected from the reflector tray 26 is relied upon to toast the upwardly facing surface of the piece of bread, roll or other item to be toasted.

When the lower oven section 12 is being used, either in the toasting or oven mode thereof, the resistance heating rods 46 are employed to heat the food-receiving compartment 14. However, the fan assembly 40 is not actuated during this mode of operation. In fact, the removable crumb-receiving tray 36 is actually positioned to separate the fan assembly 40 and music box 42 from the electrical heating assembly 44, to thereby prevent food items from falling into, and possibly damaging the fan assembly and music box during use of the lower oven section 12. It should be apparent that the lower oven section 12 is used in a conventional manner by inserting and removing food items through the front door 68. The operation of the lower oven section 12 is controlled by the conventional toaster on-off slide switch 74 and thermal control 76, when the oven is being used as a toaster, and by the combination oven and temperature setting switch 78 when the oven section is being employed as a conventional oven for heating, cooking and/or baking food items.

Figure 4:
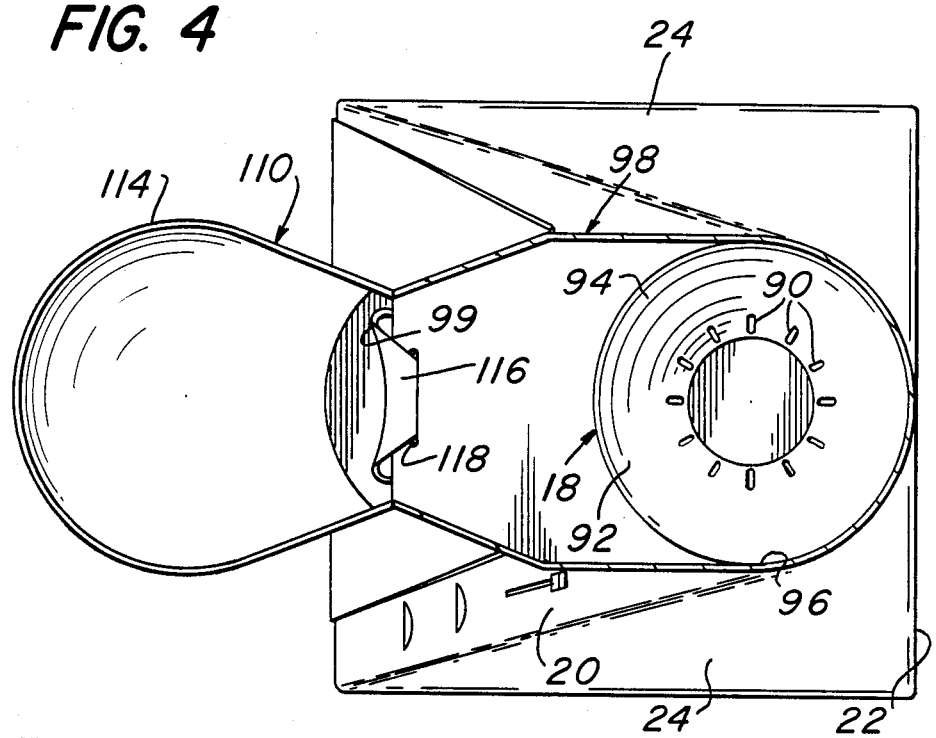
FIG. 4 is a sectional view along line 4—4 of FIG. 3.

Referring to FIGS. 3 and 4, the device 10 is shown in its configuration for use as a popcorn popper. Specifically, the kernels of corn to be popped are positioned in container 18, which has a plurality of venting passageways 90 about the periphery of sidewall 92 thereof. The sidewall 92 terminates in a circumferentially continuous upper edge 94 that is welded to, or otherwise secured to inner circumferential surface 96 of the casing, in the region where the inner surface conforms in shape to that of the upper edge 94 (See FIG. 4).

It should be noted that when the device 10 is being used as a popcorn popper the removable heat reflector tray 26 and the crumb-receiving tray 36 are removed.

As can be seen best in FIG. 3 the device 10 further includes a deflector section 98 in the form of a curved conduit having a passageway therethrough, to direct the popped kernels of corn along a predetermined path of travel to a downstream open end 99 of said deflector section. In the preferred embodiment of this invention the outer casing of the unit (except for the inclusion of a separate panel 100, to be described hereinafter) is of a one piece construction formed of a suitable metal, such as chrome or stainless steel.

Figure 7:
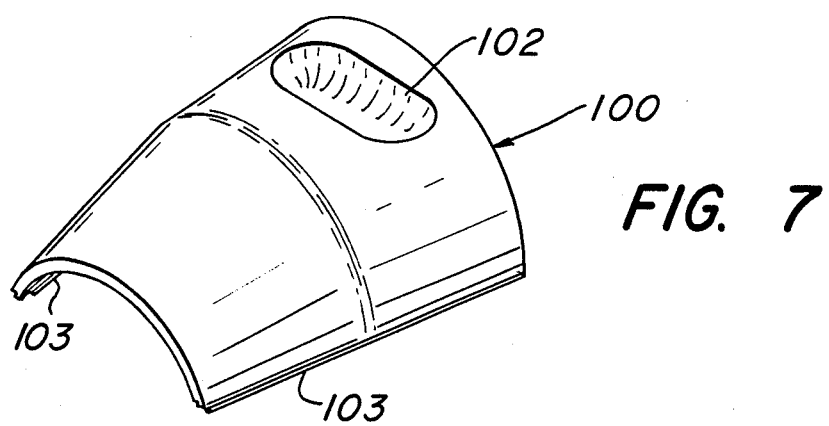
FIG. 7 is a isometric view of the removable panel in which butter to be melted is retained.
Figure 6:
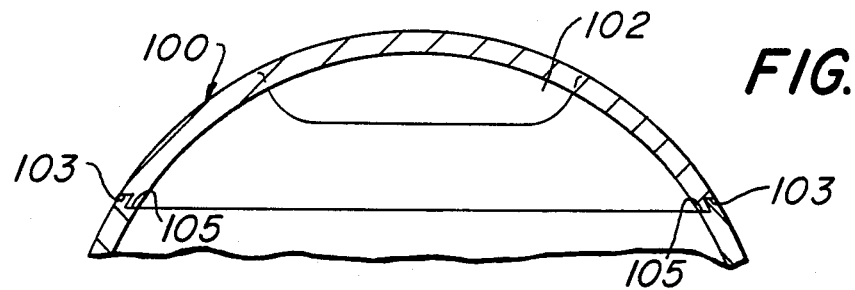
FIG. 6 is a sectional view along line 6—6 of FIG. 2.

As can be seen best in FIGS. 2, 6 and 7, the deflector section 98 includes a removable panel 100 made of the same metal as the remainder of the casing and located adjacent downstream open end 99 of the deflector section 98. This removable panel includes a butter-receiving compartment 102 therein for receiving butter which is to be melted by the heat generated in the popcorn popping mode of operation of the device 10, and when removed (FIG. 3), provides easy access into the deflector section 98 from the open end 99 for introducing the kernels of corn into the container 18. Moreover, a removable panel 100 is located in a downwardly directed segment of the deflecter section 98, to thereby permit the device 10 to be stored under a counter or similar obstruction while still permitting easy access to the container 18 from the open end 99 of said deflecter section, when the panel 100 is removed therefrom.

Referring to FIGS. 6 and 7, the lower side edges 103 and rear edge of the panel 100 have a stepped configuration (shown only on side edges 103 in FIG. 6) which mate with complimentary stepped surfaces 105 on the main casing of the deflector section 98, to thereby permit proper seating of the panel 100 on the main casing to form part of the deflector section 98. The forward or downstream edge of the main casing of the deflector section 98 also has a raised projection 107 (FIG. 2) which engages a recess at the forward end of panel 100 to prevent the panel from sliding forwardly off of the main casing.

Referring specifically to FIGS. 2 and 3, the device 10 further includes a receiver 110 which is adapted to receive popped kernels of corn when the device is being employed as a popcorn popper. When the receiver is not in use it is positioned over the open end 99 of the deflector section 98, to thereby close off the opening of the deflector. This is very desirable, since it aids in retaining heat within the device 10 when the device is being utilized to either cook or heat food items in the lower oven section 12. As can be seen in FIG. 2, the receiver 110 has a lower base section 112 which seals or closes the opening into the deflector channel 98, and peripheral side walls 114 which are retained in frictional engagement with the outer surface of the deflector 98.

Referring to FIGS. 3 and 4, the receiver 110 includes a retaining loop 116 adjacent a lower edge thereof, and this retaining loop is received within a complimentary slot 118 adjacent the downstream edge 99 of the deflector section 98, to thereby assist in positioning the receiver 110 in proper position for receiving popped kernels of corn. It should be noted that the base 112 of the receiver 110 is positioned in engagement with the front door 68 of the oven section 12, to thereby position an open marginal end 120 of the receiver in proper position relative to the downstream end 99 of the deflector section 98 for receiving the popped kernels of corn therein.

When the device 10 is used as a popcorn popper the removable heat reflector tray 26 and removable crumb-receiving tray 36 are removed. The panel 100 is removed, as shown in solid representation in FIG. 3, to provide easy access for introducing the kernels to be popped into the container 18, and the panel 100 then is replaced on the main casing, as is shown in phantom representation in FIG. 3.

To use the popcorn popper the lowermost dial 80 (FIG. 1) is set for the desired popping time, which depends upon the quantity of kernels placed in the container 18. When the dial 80 is turned from its initial "off" position, it completes an electrical circuit for both the fan assembly 40 and the heating assembly 44, thereby generating heat through the heating rods 46, and driving that heat through the vented passageways 90 of the container 18 by operation of the fan assembly. The heat directed adjacent and through the container 18 is sufficient to cause the kernels of corn to "pop", and the inertia applied to the popped kernels drives the kernels through the deflector section 98 and out of the downstream end 99 thereof into the receiver 110. The timer dial 80 also is electrically connected through a conventional R-C timing circuit to the music box 42, to turn the music box on for a predetermined period of time following the end of the timing cycle. In other words, at the end of the preset time set on the dial 80, the music box is actuated for a predetermined period of time (e.g., ten seconds) to provide an audible signal that the popping cycle has been completed.

The electrical circuitry associated with the various controls of the device 10 preferably is located in the space between the outer sidewall 24 adjacent the controls and the inner sidewall member 29 spaced from said outer sidewall.

It should be apparent that the operation of the fan assembly 40 will drive heat generated in the resistance heating rods 46 upwardly against the container 18, in view of the fact that both the removable heat reflector tray 26 and the removable crumb-receiving tray 36 are removed from the device 10. When it is intended to again use the lower oven section 12 to either heat or cook food items therein it is a simple matter to merely replace the reflector tray 26 and crumb-receiving tray 36, and to reposition the receiver 110 over the downstream end 99 of the deflector section 98, as is illustrated in FIG. 2.

The heat which is driven through the venting passageways 90 of the container 18 is sufficient to melt any butter that is retained in the butter-receiving well 102 of the panel 100. Thereafter, the panel 100 can be easily separated from the remainder of the deflector 98, and the melted butter added directly to the popcorn in the receiver 110.

Without further elaboration, the foregoing will so fully illustrate my invention that others may, by applying current or future knowledge, adopt the same for use under various conditions of service.

What is claimed as the invention is:

1. A combination oven and popcorn popper unit usable to cook or heat food items and also to pop popcorn kernels, said oven and popcorn popper including:
   (a) a lower oven section having walls defining a food-receiving compartment, said food-receiving compartment including a support means therein for supporting food items to be cooked or heated;
   (b) a container above said oven section for receiving kernels of corn to be popped;
   (c) heating means below said support means for providing heat for said oven section and for popping kernels of corn in said container; and
   (d) deflector means communicating with said container for deflecting popped kernels of corn along a predetermined path of travel.

2. The combination oven and popcorn popper unit of claim 1 wherein said deflector means includes an opening at an end remote from the container, further including a receiver for popped kernels of corn removably retained over said opening for sealing said opening when the lower oven section is being employed to either cook or heat food items therein, said receiver including a retaining member cooperable with a section of the deflector means for supporting and retaining the receiver adjacent the opening at the end of the deflector remote from the container in a position to receive popped kernels of corn from the deflector means.

3. The combination oven and popcorn popper unit of claim 1 wherein an upper wall of said oven section is a removable heat reflector means for reflecting heat into the food-receiving compartment, said removable heat reflector means being removable when said unit is being employed as a popcorn popper.

4. The combination oven and popcorn popper unit of claim 3 wherein said heating means includes blower means for forcing heat upwardly into engagement with said container for heating kernels of corn in said container.

5. The combination oven and popcorn popper unit of claim 4 wherein said container includes venting passageways therethrough for permitting heated air to pass through the container and into said deflector means.

6. The combination oven and popcorn popper unit of claim 4 including a removable tray positioned above the heating means and below the support means for preventing food positioned on the support means from falling into the heating means, said removable tray being removed when said unit is employed to heat kernels within the container.

7. The combination oven and popcorn popper unit of claim 1 wherein said deflector means includes means for retaining butter therein.

8. The combination oven and popcorn popper unit of claim 1 including timer means for setting a predetermined popping time during which the heating means is actuated, and music means for providing an audible signal at the end of said predetermined popping time.

9. The combination oven and popcorn popper unit of claim 1 wherein said deflector means includes a removable panel having a butter-receiving well in an outer surface thereof.

10. The combination oven and popcorn popper unit of claim 1 wherein said oven section is a toaster-oven including a toaster on-off switch and a separate on-off switch for operating the oven at a predetermined temperature setting.

11. The combination oven and popcorn popper unit of claim 1 wherein said deflector means is a conduit forming a continuous extension of the lower oven section, said container being disposed within the conduit and including passageways therethough for permitting heat from the heating means to pass through said container and through said conduit.

* * * * *